US006829932B2

United States Patent
Laun et al.

(10) Patent No.: US 6,829,932 B2
(45) Date of Patent: Dec. 14, 2004

(54) METHOD AND DEVICE FOR DETECTING A FILING PROCESS

(75) Inventors: Robert Laun, Hausach (DE); Dieter Haas, Lauterbach (DE)

(73) Assignee: VEGA Grieshaber KG, Wolfach (DE)

( * ) Notice: Subject to any disclaimer, the term of this patent is extended or adjusted under 35 U.S.C. 154(b) by 0 days.

(21) Appl. No.: 10/202,008

(22) Filed: Jul. 25, 2002

(65) Prior Publication Data

US 2003/0033869 A1 Feb. 20, 2003

(30) Foreign Application Priority Data

Aug. 9, 2001 (DE) .......................................... 101 39 242

(51) Int. Cl.$^7$ .......................... G01F 23/28; A01D 90/00
(52) U.S. Cl. ..................................... 73/290 V; 340/621
(58) Field of Search ........................ 73/290 V; 340/621

(56) References Cited

U.S. PATENT DOCUMENTS

| | | | | | |
|---|---|---|---|---|---|
| 4,114,441 A | * | 9/1978 | Magri | ....................... | 73/290 V |
| 4,437,497 A | * | 3/1984 | Enander | ....................... | 141/1 |
| 4,675,854 A | * | 6/1987 | Lau | ....................... | 367/98 |
| 4,700,569 A | * | 10/1987 | Michalski et al. | ......... | 73/290 V |
| 4,890,266 A | * | 12/1989 | Woodward | .................... | 367/99 |
| 5,042,298 A | * | 8/1991 | Grein et al. | ............... | 73/290 V |
| 5,131,271 A | * | 7/1992 | Haynes et al. | ............. | 73/290 V |
| 5,337,289 A | * | 8/1994 | Fasching et al. | ............. | 367/140 |
| 5,498,867 A | * | 3/1996 | Senuma et al. | ......... | 250/231.18 |
| 5,587,969 A | * | 12/1996 | Kroemer et al. | ............... | 367/99 |
| 5,749,783 A | * | 5/1998 | Pollklas | ....................... | 460/119 |
| 5,827,943 A | * | 10/1998 | Schmidt | ...................... | 73/1.73 |
| 5,948,979 A | * | 9/1999 | Fitsch et al. | ............... | 73/290 V |
| 6,415,660 B1 | * | 7/2002 | Sinz et al. | ................. | 73/290 R |

FOREIGN PATENT DOCUMENTS

| | | | |
|---|---|---|---|
| DE | 33 37 690 A1 | * | 4/1985 |
| DE | 42 18 303 C1 | * | 3/1994 |
| DE | 42 34 300 | | 4/1994 |
| DE | 42 34 300 A1 | * | 4/1994 |
| DE | 43 32 071 A1 | * | 3/1995 |
| DE | 195 31 540 | | 2/1997 |
| EP | 0 961 106 A1 | * | 12/1999 |
| EP | 1 014 049 A2 | * | 6/2000 |

* cited by examiner

Primary Examiner—Hezron Williams
Assistant Examiner—Rose M. Miller
(74) Attorney, Agent, or Firm—Nath & Associates PLLC; Marvin C. Berkowitz

(57) ABSTRACT

In order to detect a filling process, a signal is emitted into the container and an echo reflected from the container is recorded. At least one parameter, e.g., the amplitude h(t) of the reflected echo at a time t, is determined, and a filling process is detected if the parameter lies outside an expected range.

13 Claims, 2 Drawing Sheets

METHOD AND DEVICE FOR DETECTING A FILING PROCESS

FIELD OF THE INVENTION

The present invention pertains to a method and a device for detecting a filling process.

BACKGROUND OF THE INVENTION

When monitoring the level of free-flowing or pourable materials, one frequently utilizes sensors that emit a signal into the container, receive reflected signals from the container and make it possible to estimate the level in the container by means of a signal analysis.

These sensors function satisfactorily as long as the level in the interior of the container does not vary to a significant degree such that a well defined surface of the material exists. The contribution of this well defined surface to the echo signal can be isolated and evaluated. Although such an evaluation is complicated by the contributory echoes reflected on the walls of the container or container installations, these contributory echoes can usually be differentiated from the echo of the material level due to the fact that the former only change over time if the surface reflecting the echo is either covered by the material or uncovered again. This means that the echo of the material level can, in the long term, be differentiated from interference echoes due to the fact that the transit time is variable in the long term with respect to the former [material] contributory echo; with respect to the latter [interference] contributory echo, the transit time remains unchanged, but its amplitude varies.

When such a container is filled, the echo signal relations are changed. Dust particles or material particles suspended in the air may cause a signal attenuation. The amplitude of the interference echo signals and the echo signal of the material level are changed; material may adhere to the container walls or fall off said container walls such that information on contributory interference echoes obtained at an earlier time is not necessarily valid during and after the filling process. If the signals used consist, in particular, of acoustic signals, the noise of the filling process may be superimposed with the echo signals and mask contributory echoes. Also, the flow of material being introduced into the container may also be the cause of interference echo signals if the emitted signal is reflected by this inflow.

Due to all these interfering influences, a level measurement by means of an echo signal that is evaluated with algorithms that provide satisfactory results may lead to usable results if the measurement is carried out while the container is filled. In order to ensure a constant and reliable level measurement, it is necessary to utilize different algorithms or parameters for estimating the level from the echo signal, namely in dependence on the fact of whether or not a filling process currently takes place.

If the evaluation of the echo signals should be automatically carried out in an evaluation unit, it is necessary that the evaluation unit not only receive the echo signal, but also information as to the fact of whether or not a filling process currently takes place. This type of information may, for example, be obtained by tapping a control signal that controls the open or closed state of a container filling closure element, from a control device of the filling closure element or by a position sensor arranged on the element. In both instances, it is necessary to prepare the container or its control device for tapping the required signal or to perform structural changes on the container or its control device.

SUMMARY OF THE INVENTION

The present invention is based on the objective of disclosing a method for detecting a filling process in a container and a device for carrying out said method which eliminate the necessity to prepare or perform structural changes on the container.

This objective is attained with a method that comprises the following steps a) a signal is emitted into the container and the echo reflected from the container is recorded, b) parameters of the reflected echo signals are determined, and c) a filling process is detected if the parameters lie outside expected ranges, wherein a device with a transceiver unit is provided for carrying out step a, and wherein an evaluation unit is provided for carrying out steps b and c.

In order to practically define the limits of the expected ranges, it is preferred to carry out measurements of the respective parameters while no filling process takes place, with the expected ranges being defined based on the thusly obtained typical parameter values while no filling of the container takes place.

These measurements can be carried out at various levels of the container. The parameters preferably are generated automatically during the operation once the device is installed.

The parameters for evaluating whether or not a filling process takes place preferably consist of amplitude values of the echo signals. According to one simple embodiment of the method, the parameter may consist of at least one amplitude value that is respectively measured within a given time after the signal is emitted. The amplitude value may, however, also be averaged over the entire time history or one or more intervals of the time history of the echo in order to improve the reliability of this evaluation.

Another suitable parameter consists of the degree of the amplitude fluctuations over the time history of the echo signals. These amplitude fluctuations are relatively small if the echo signals are superimposed with a loud noise caused by the filling process or if the echo signals reflected from the container are attenuated by the flow of material being introduced into the container.

Such a parameter can be easily obtained by adding the differences between amplitude measuring values of the echo signals which are recorded at successive times.

Since the echo amplitude usually drops over time after the signal is emitted, it is practical to only add the differences in which the amplitude of the later measuring value is higher than that of the earlier measuring value during the calculation of the parameter. Another option consists of forming a weighted sum of echo signal amplitude values at different times. In this case, an increasing weighting factor is preferably chosen over the time history of the echo signal.

Naturally, it is also possible to determine whether a filling process takes place or not by determining a series of parameters of the reflected echo, wherein a filling process is detected if at least a predetermined number of parameters lies outside the respective expected range.

Other characteristics and advantages of the invention are discussed in the following description of embodiments which refers to the enclosed figures. Shown are:

DETAILED DESCRIPTION

Figure 1:
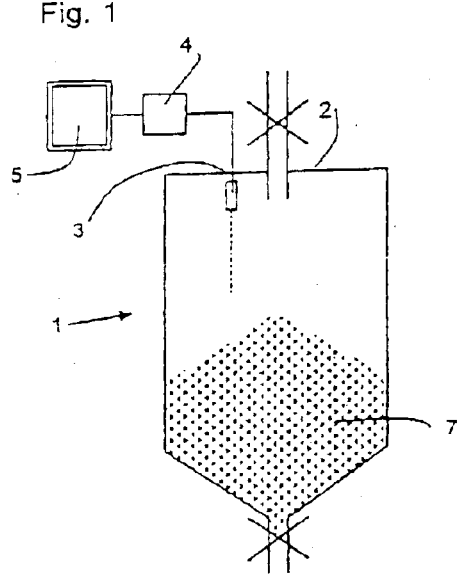
FIG. 1, a schematic section through a bulk material container equipped with a level measuring device.

FIG. 1 shows a schematic vertical section through a container equipped with a level measuring device. The level measuring device conventionally comprises a transceiver unit 3 that is mounted in the interior of the container 1, namely on its cover 2, an evaluation unit 4 that is connected to the transceiver unit 3, and a display unit 5, e.g., a kinescope. The evaluation unit 4 may be realized in the form of a suitably programmed microprocessor that is assigned to the transceiver unit 3; however, the evaluation unit may also consist of a conventional computer that communicates with the transceiver unit 3 via a (not-shown) interface and is able to execute a program for realizing the method that is described in greater detail below. The transceiver unit 3 emits a signal, in particular, an ultrasonic signal, into the lower region of the container 1 in which the material 7 to be measured is situated, wherein the transceiver unit receives an echo signal reflected by the material 7 and the walls of the container 1.

Figure 2:
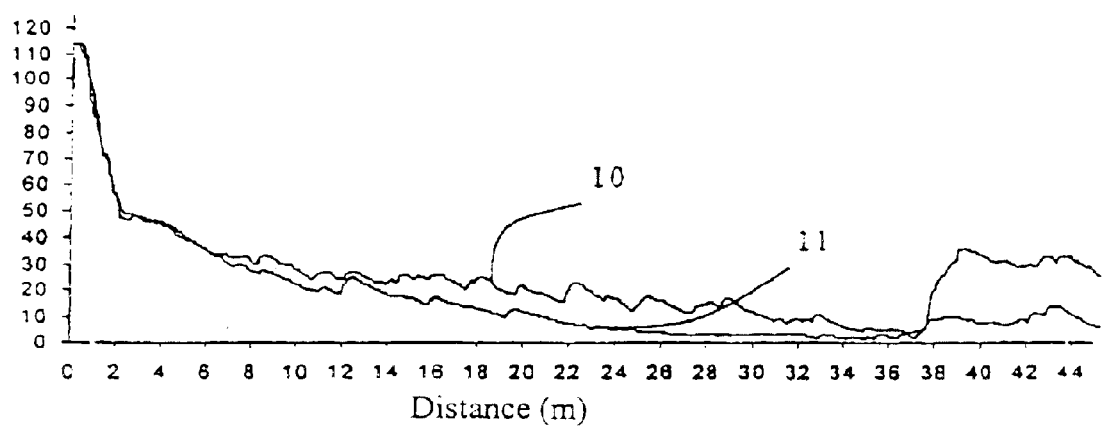
FIG. 2, the time history of the amplitude of a typical echo signal, namely while no filling process takes place and [also] while the container is being filled.

FIG. 2 shows a graphical representation that indicates the typical progression of such an echo signal. In this case, the distance traveled in meters which corresponds to the transit time of the echo signal is plotted along the abscissa, and the amplitude of the echo signal in decibels is plotted along the ordinate. The two curves 10, 11 respectively show the typical time history of an echo signal while no filling of the container takes place and during a filling process. A comparison between these two curves indicates that the signal amplitude progression of the curve 11 that corresponds to the filling process is altogether lower and also contains fewer details.

The different amplitudes of these two curves 10, 11 can be used for evaluating whether a filling process takes place or not in different ways.

With respect to the container on which these curves were measured, a comparison between the curves 10 and 11 shows that clear differences in amplitude exist between the two curves for distances of 16–32 m and approximately 39–46 m. If these differences in amplitude exist independently of the respective level at which the curves 10 and 11 were recorded, it would, according to one simple embodiment of the new method, suffice to merely calculate a function of the distance value in order to detect a filling process, wherein typical amplitudes of the echo signal for this distance are measured at various levels in order to thusly define an expected range for the amplitude, and wherein a filling process is always detected if the measured amplitude lies below the expected range.

In order to improve the reliability of such an evaluation, the expected range can also be determined based on a series of distance values, wherein a filling process is always detected if a function of the measured amplitudes for these distance values lies below the expected range.

The same advantage is attained if the amplitude of the curve 11 is not only compared with an expected range at certain points, but at least one expected range for amplitude values of the echo signal which are averaged over a suitably chosen distance interval is initially defined while no filling of the container takes place, wherein the average value of the curve 11 in the corresponding interval is compared with the expected range in order to detect a filling process.

An alternative option for defining an expected range for the echo signal amplitude is based on an analysis of the interference echoes. In this case, the term interference echoes refers to contributory echo signals that occur independently of the actual level in the container and consequently are caused by reflections on the container walls.

Figure 3:
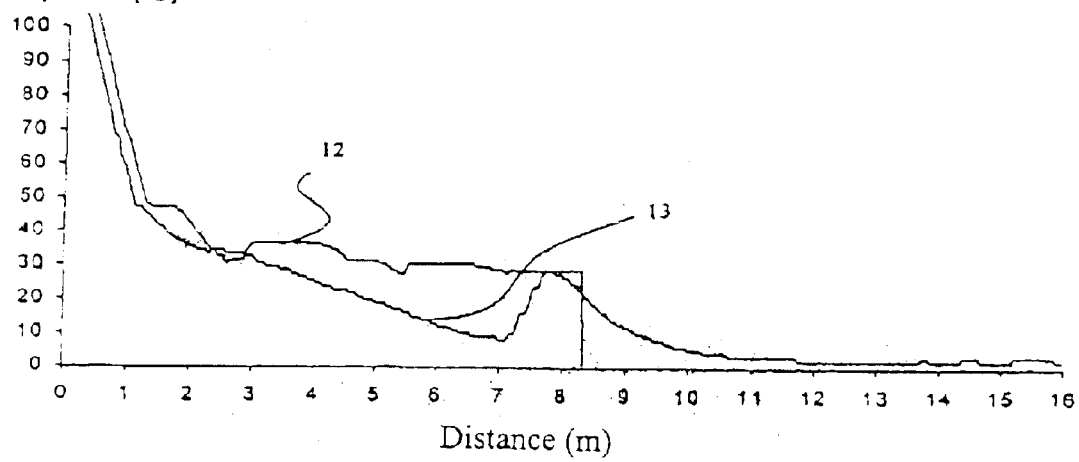
FIG. 3, the progression of an echo signal recorded during the filling of the container in comparison with an interference echo.

The curve 12 in FIG. 3 shows the progression of such interference echoes as a function of the distance. Since the interference echo curve corresponds to the portion of the echo signals which is not variable in dependence on the level, it only has an amplitude that is not negligible at relatively short distances, namely below approximately 8 m in the embodiment according to FIG. 3. This amplitude is stored in a memory of the evaluation unit 4 and is compared with periodically measured echo signals by the evaluation unit 4.

If an echo signal progression in the form of the curve 13 is measured, wherein the amplitudes of said curve are locally smaller than those of the interference echo curve 12, it must be assumed that this is caused by signal absorption within a short distance of the transceiver unit 3. Signal attenuations due to "dust" may be responsible for such a signal absorption. In this embodiment of the method according to the invention, the entire surface of the diagram according to FIG. 3 above the curve 12 forms an expected range, and a progression of the echo signal outside the expected range, e.g., as is the case with the curve 13, results in the detection of a filling process.

In order to measure a filling process, it is not necessary for the curve 13 of the echo signal to extend below the interference echo curve 12 in the entire distance range in which the interference echo curve was determined. In this case, it suffices if the curve 13 lies below the interference echo curve 12 over a predetermined section of this distance range. In order to improve the reliability of detecting a filling process, the evaluation unit 4 may comprise a low-pass filter in which the echo signal is filtered before it is compared with the curve 13.

Another option for detecting a filling process by means of an echo signal analysis consists of the relative lack of details of the echo signal curve 11 in comparison with the curve 10 shown in FIG. 2. A comparison between these two curves clearly indicates that a series of peaks in the curve 10 simply is nonexistent in the curve 11 recorded during the filling process. In other words, the curve 10 has a much greater "roughness" than the curve 11.

In order to quantify and compare this roughness, it is, according to another embodiment of the invention, proposed to record a series of sampling values h(t1), h(t2) . . . of the echo signal, wherein the sampling times $t_1, t_2, \ldots$ follow one another with a predetermined interval Dt and the sum $$R = \sum_i p(h(t_i) - h(t_{i-1}))$$

is calculated for each echo signal, and wherein the function p(x) has the value x for all positive x and otherwise has the value 0.

Figure 4:
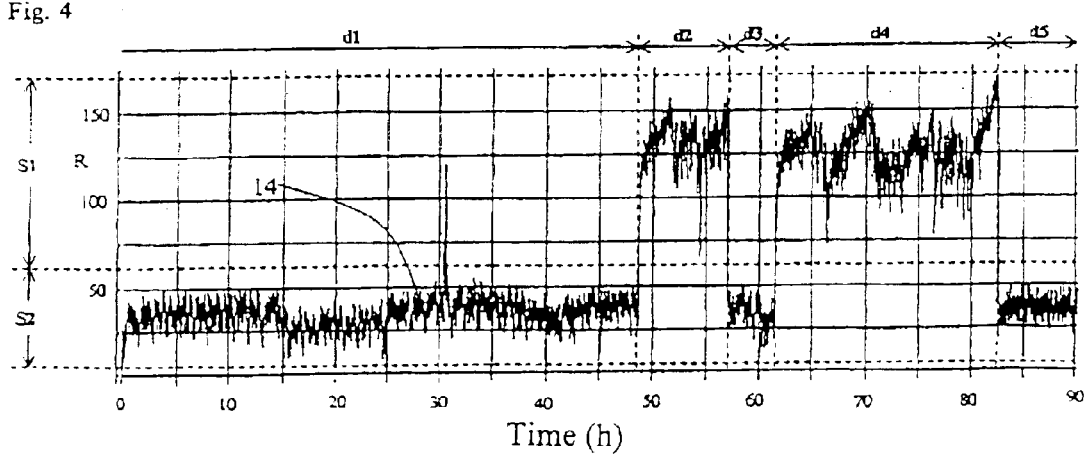
FIG. 4, the time history of a roughness parameter of the echo signal which is calculated for a series of successively generated echoes.

FIG. 4 shows a curve 14 that is formed from a sequence of values of this sum R which were recorded on the container over the course of a period in which filling processes and stages in which the container is not filled take place alternately. One can clearly ascertain that the values of the sum R lie in two value ranges S1, S2 that are clearly separated from one another, namely depending on the fact of whether a filling process takes place, as is the case in the intervals d1, d3, d5, or does not take place, as is the case in the intervals d2, d4.

Naturally, it would be possible to realize various additional developments in order to further improve the reliability of detecting a filling process. For example, FIG. 2 shows that the difference in amplitudes of the echo signals is small over short distances during a filling process and when no filling process takes place, with this difference tending to increase as the distance increases. This can be utilized by not directly comparing the amplitude of the echo signals, but rather by forming the product of the echo signal amplitude and the transit time and comparing instantaneous values or average values of this product in the same fashion as described above with reference to FIG. 2.

The previously described parameters that may be considered as criteria for detecting a filling process, namely the amplitude at certain points, the averaged amplitude, the roughness R and other parameters that are not specifically cited in the previous description, may also be replaced with their chronological derivation over the course of successive measuring processes according to the present invention. For example, an expected range that lies around zero can be defined for the chronological derivation of the amplitude or the roughness. If the change of the parameter over the course of successive measuring processes lies outside the expected range, it must be assumed that a filling process is taking place.

What is claimed is:

1. Method for detecting an ongoing filling process, comprising the following steps:
   a) emitting a signal in a direction of a material and recording reflected echo signals over a predetermined time span,
   b) determining at least one parameter from the reflected echo signals,
   c) determining an expected range of the at least one parameter corresponding to when no filling process is taking place,
   d) comparing a measured value of the at least one parameter to the expected range thereof, and
   f) determining that a filling process is ongoing if the measured value lies outside the expected range.

2. Method according to claim 1, characterized by the fact that the expected range is defined based on measurements of the parameters which are carried out while no filling process takes place.

3. Method according to claim 1, characterized by the fact that the expected range is defined based on measurements of the parameters which are carried out at various levels of the container.

4. Method according to claim 1, characterized by the fact that the parameter(s) consist(s) of one or more amplitude values, preferably one or more amplitude values that are averaged over the time history of the echo signals.

5. Method according to claim 1, characterized by the fact that the parameter(s) represent(s) a measure for the intensity of amplitude fluctuations of the echo signals.

6. Method according to claim 5, characterized by the fact that the parameter(s) is/are obtained by adding the differences between measuring values of the echo signal amplitude which are recorded at successive times.

7. Method according to claim 6, characterized by the fact that a difference is only taken into account during the adding process if the amplitude of the later measuring value is higher than that of the earlier measuring value.

8. Method according to claim 1, characterized by the fact that the parameter consists of a weighted sum of echo signal amplitude values at different times.

9. Method according to claim 8, characterized by the fact that the weighting factor increases over the time history of the echo signal.

10. Method according to claim 1, characterized by the fact that step b) is carried out for a series of parameters, wherein a filling process is detected if at least a predetermined portion of the parameters lies outside an expected range.

11. Method according to claim 1, characterized by the fact that the filling process takes place in a container.

12. Method according to claim 1, characterized by the fact that the emitted signal consists of an ultrasonic or microwave signal.

13. Device for detecting a filling process, in particular, for carrying out the method according to claim 1, with a transceiver unit (3) for emitting a signal into the container and recording reflected echo signals over a predetermined time span, and with an evaluation unit (4) that is connected to the transceiver unit and serves for determining at least one parameter of the reflected echo signals and for detecting a filling process if the parameter lies outside an expected range.

* * * * *